United States Patent [19]

Boissin

[11] Patent Number: 5,307,639
[45] Date of Patent: May 3, 1994

[54] TRANSFER LINE FOR CRYOGENIC FLUID

[75] Inventor: Jean-Claude Boissin, Saint Ismier, France

[73] Assignee: L'Air Liquide Societe Anonyme pour l'Etude et l'Exploitation des Procedes Georges Claude, Paris, France

[21] Appl. No.: 947,381

[22] Filed: Sep. 21, 1992

[30] Foreign Application Priority Data

Sep. 20, 1991 [FR] France ................... 91 11596

[51] Int. Cl.⁵ .................. F17C 13/00; F16L 9/18
[52] U.S. Cl. ..................... 62/50.7; 138/112; 138/113; 138/114
[58] Field of Search ............... 62/50.7; 138/112, 113, 138/114

[56] References Cited

U.S. PATENT DOCUMENTS

| | | | |
|---|---|---|---|
| 3,548,158 | 12/1970 | McCaskill | 138/112 X |
| 3,565,118 | 2/1971 | Stearns | 138/112 |
| 3,782,452 | 1/1974 | Ceplon | 138/112 |
| 3,791,416 | 2/1974 | Ziemek et al. | 138/112 |
| 3,904,394 | 9/1975 | Prast et al. | 62/50.7 |
| 4,014,369 | 3/1977 | Kobres, Jr. | 138/112 |
| 4,036,617 | 7/1977 | Leonard et al. | 138/112 X |
| 4,233,816 | 11/1980 | Hensley | 138/112 X |
| 4,303,105 | 12/1981 | Rohner | 138/113 X |
| 4,492,089 | 1/1985 | Rohner et al. | 62/50.7 |

FOREIGN PATENT DOCUMENTS

| | | | |
|---|---|---|---|
| 1190139 | 11/1985 | U.S.S.R. | |
| 1081889 | 9/1967 | United Kingdom | 138/112 |
| 1274285 | 5/1972 | United Kingdom . | |
| 1451093 | 9/1976 | United Kingdom . | |

Primary Examiner—Henry A. Bennet
Assistant Examiner—Christopher B. Kilner
Attorney, Agent, or Firm—Young & Thompson

[57] ABSTRACT

Transfer line for cryogenic fluid comprising a transfer conduit (1) for cryogenic fluid and a conduit (3) for cooling fluid surrounded by a metallic shield (4) coupled thermally to the cooling conduit (3). The metal shield (4) is a thin strip wound in unsecured manner about the conduits (1, 3) and locally connected to the cooling conduit (3) by resilient clips (5) or by a layer (6) of connecting material. The metallic strip has a thickness no greater than 0.1 mm and can be of aluminum.

12 Claims, 1 Drawing Sheet

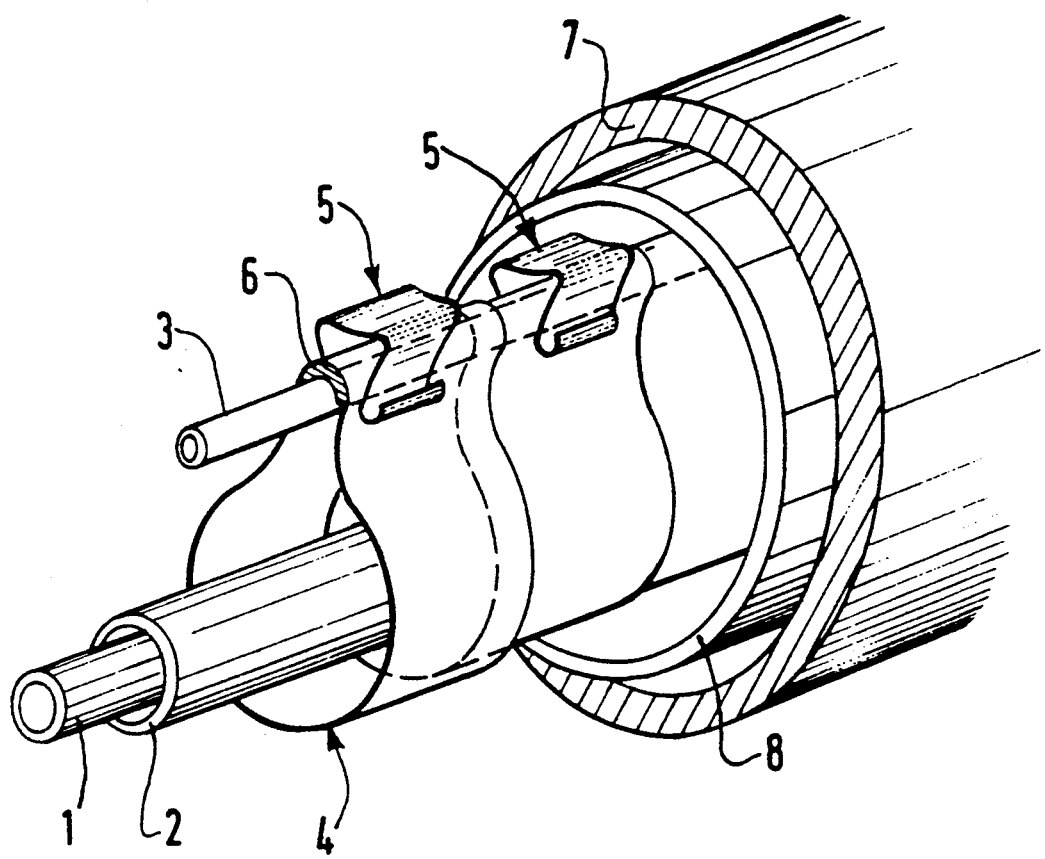

TRANSFER LINE FOR CRYOGENIC FLUID

The present invention relates to transfer lines for cryogenic fluid of the type comprising a transfer conduit for cryogenic fluid surrounded by a metallic shield coupled thermally to a conduit for cooling fluid.

Transfer lines of this type are provided for equipment operating at very low temperature, typically below 50° K., such as superconductive resonant cavities and superconductive magnets of particle accelerators which are cooled and maintained cold by liquid helium to a temperature below 5° K., the cooling fluid of the shield being generally liquid nitrogen. The proper functioning of the so-called "active" metallic shield requires that it be in good thermal contact with the cooling tube. For these reasons, in the known art, the metal shield is constituted by extruded profiles of aluminum or copper comprising one or several channels in which circulates the cooling fluid. These known techniques have the drawback of extremely high production cost, high thermal inertia resulting from the thickness of the profiles constituting the active shield, high rigidity which can pose problems of thermal contraction, as well as poor access to the transfer line of the coldest cryogenic fluid.

The present invention has for its object to provide a new structure of transfer line of simple conception and very low production cost, having thermal characteristics analogous to those of the prior art, permitting numerous adaptations and providing good access to the internal transfer line.

To achieve this, according to a characteristic of the invention, the metallic shield is constituted by a thin wound strip, typically unsecured, about the conduits and locally fixed to the cooling conduit.

According to more particular characteristics of the invention, the fixing to the cooling conduit is effected by means of mechanical gripping and/or interposition of a layer of a connecting material.

Other characteristics and advantages of the present invention will become apparent form the following description of an embodiment, given by way of non-limiting example, in connection with the accompanying drawing, in which:

The single FIGURE shows in perspective and partial cross section a transfer line according to the invention.

The transfer line shown in the single FIGURE comprises a transfer conduit 1 for a cryogenic fluid at very low temperature, typically liquid helium, or cold gaseous helium or liquid hydrogen. The conduit 1 is made for example of stainless steel and is surrounded by a layer or sleeve of insulation or superinsulation 2. Parallel to the conduit 1 extends a conduit 3 for cooling fluid, made for example of stainless steel, typically conveying liquid nitrogen. Interconnecting means (not shown) are disposed between the two conduits 1 and 3.

According to the invention, the two conduits 1 and 3 are surrounded by a metal shield 4 produced by winding in one or several layers a thin strip of a thickness typically not greater than 0.1 mm, of a metal which is a good heat conductor, typically aluminum of a thickness of 10 $\mu$m.

Winding is effected without securement, typically in a loose fashion, so as not to exert damaging pressure on the insulation layer 2 surrounding the tube 1. The thermal contact between the shield 4 and the cooling tube 3 is preferably obtained by resilient metal clips 5 strongly applying the shield 4 at several spaced apart points along the tube 3. The material of the clips is selected to retain its elasticity at very low temperature. The length, the gripping force and the interval of the clips 5 are determined so as to obtain the thermal conduction necessary to maintain the temperature of the shield 4 sufficient low and near that of the cooling tube. As a modification, in replacement of the clips 5 or preferably in addition to these latter, the connection between the shield 4 and the cooling tube 3 is effected at predetermined regions by interposition of a layer 6 of glue, resin or cement or of a soft metal such as indium.

The transfer line which has been described is conventionally disposed within a sealed envelope 7 in which is created and maintained a vacuum at a pressure lower than $10^{-3}$ Pa, the insulation being preferably completed by an insulating or superinsulating sleeve 8 surrounding the shield 4 and its clips 5 within the envelope 7.

Although the present invention has been described in relation to particular embodiments, it is not thereby limited, but on the contrary is susceptible to modifications and variations which will be apparent to one skilled in the art.

What is claimed is:

1. A transfer line for cryogenic fluid, comprising a first conduit for cryogenic fluid, a second conduit for a cooling fluid, a shield made of a thin metal strip loosely wrapped around the first and second conduits, and a plurality of connecting means for locally connecting the shield to the second conduit.

2. The transfer line of claim 1, wherein the connecting means are spaced apart lengthwise of the second conduit.

3. The transfer line of claim 1, wherein the connecting means include discrete pinching devices.

4. The transfer line of claim 3, wherein each pinching device is comprised of an integral resilient clip.

5. The transfer line of claim 1, wherein the connecting means include pads of connecting material interposed locally between the second conduit and the shield.

6. The transfer line of claim 5, wherein the pads are of a soft metal.

7. The transfer line of claim 3, wherein the connecting means further include pads of connecting material interposed locally between the second conduit and the shield.

8. The transfer line of claim 1, wherein the strip is made of aluminum and has a thickness no greater than 0.1 mm.

9. The transfer line of claim 3, wherein the strip is made of aluminum and has a thickness no greater than 0.1 mm.

10. The transfer line of claim 1, further comprising a first insulating sleeve surrounding the first conduit and surrounded by the shield.

11. The transfer line of claim 9, further comprising a second insulating sleeve surrounding the shield and the connecting means.

12. The transfer line of claim 10, further comprising a surrounding outer sealed envelope.

* * * * *